United States Patent [19]
Gentner

[11] Patent Number: 5,846,583
[45] Date of Patent: Dec. 8, 1998

[54] TEMPERATURE SENSING METHOD AND SYSTEM FOR PASTEURIZATION

[75] Inventor: Thomas F. Gentner, Westfield, N.Y.

[73] Assignee: Welch's Foods, Inc., Concord, Mass.

[21] Appl. No.: 855,362

[22] Filed: May 13, 1997

[51] Int. Cl.$^6$ .................................. A23C 3/00; A23L 3/00
[52] U.S. Cl. .............................. 426/231; 99/453; 99/470; 426/521
[58] Field of Search ..................................... 426/231, 521, 426/522; 99/452, 453, 470; 422/3, 26

[56] References Cited

U.S. PATENT DOCUMENTS

| | | | |
|---|---|---|---|
| 1,977,738 | 10/1934 | Olson | 426/522 |
| 4,839,142 | 6/1989 | Charm | 426/522 |
| 5,266,343 | 11/1993 | Stauffer | 426/522 |
| 5,360,055 | 11/1994 | Hup et al. | 426/522 |
| 5,443,857 | 8/1995 | Arph et al. | 426/522 |
| 5,503,064 | 4/1996 | Scheel et al. | 99/453 |
| 5,514,389 | 5/1996 | Nikdel et al. | 426/231 |

OTHER PUBLICATIONS

Norman N. Potter, Joseph H. Hotchkiss, "Food Science" 1995, 5th Edition, pp. 157–158.

*Primary Examiner*—George Yeung
*Attorney, Agent, or Firm*—Finnegan, Henderson, Farrabow, Garrett, Dunner, L.L.P.

[57] ABSTRACT

A method and system are provided for pasteurizing a fluid product. Heated fluid product flows through a passageway to a directional flow valve for directing the heated fluid product through either a primary flow path or a divert flow path. A temperature sensor senses temperature of the heated fluid product at a location in the passageway spaced from the valve so that change in temperature of a portion of the heated fluid product is sensed before that portion of the heated fluid product flows to the valve. The valve directs flow of the heated fluid product from the passageway to the divert flow path when the sensed temperature is below a predetermined temperature for pasteurization of the fluid product, and continues to direct the flow to the diverting flow path at least until the sensed temperature is at or above the predetermined temperature for a predetermined period of time. Optionally, a second temperature sensor is provided near the valve to monitor temperature of the fluid product before switching the valve for flow along the primary flow path.

17 Claims, 1 Drawing Sheet

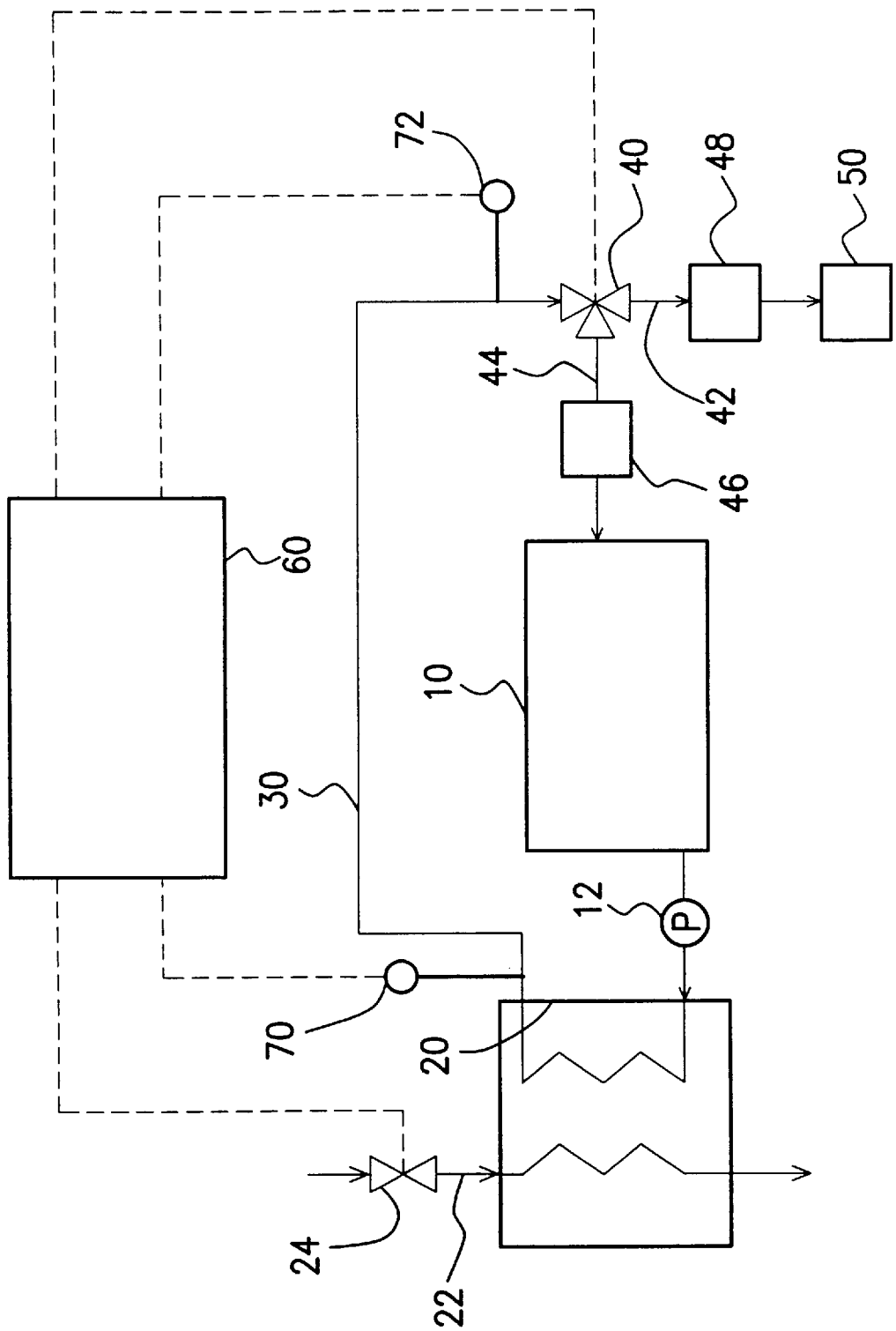

TEMPERATURE SENSING METHOD AND SYSTEM FOR PASTEURIZATION

BACKGROUND OF THE INVENTION

1. Field of the Invention

The present invention relates to a method and system for pasteurizing a fluid product. More particularly, the present invention relates to a method and system for sensing temperature of a heated liquid product and controlling a directional flow valve based on the sensed temperature to ensure proper pasteurization.

2. Description of Related Art

Many different types of liquid products are pasteurized to reduce or to eliminate microorganisms. During a pasteurization process, liquid product is heated for a sufficient amount of time and at a sufficient temperature to kill all or substantially all of the microorganisms initially present in the liquid. As a result of numerous scientific studies, governments and industries have established standard operating parameters for pasteurization of particular products. For example, these standards include the recommended minimum temperature at which the product should be heated and the recommend minimum time during which the product should be at or above the minimum temperature.

If a liquid product is not heated for a sufficient amount of time or at a sufficient temperature, serious consequences could result. When a liquid product is not adequately pasteurized, surviving microorganisms can grow and cause spoilage. The survival of microorganisms intended to be killed in the pasteurization process can cause health risk to the consumer and/or economic loss to the producer.

Various attempts have been made to improve pasteurization processes, but some of these approaches have had limited success. In one approach, a temperature sensor for sensing temperature of heated liquid product is placed in a holding coil between a liquid heater and a valve, immediately adjacent to the valve. When the temperature sensor senses that the liquid product is below a predetermined required temperature, the valve directs flow of liquid product to a secondary flow path rather than a path for properly pasteurized liquid. However, the inventor has discovered that this configuration allows for flow of under-pasteurized product to the path for properly pasteurized liquid before reduced temperature liquid product is sensed by the sensor. Such an arrangement also may allow flow of under-pasteurized product to the path for properly pasteurized liquid when flowing liquid product includes cycles of low temperature product mixed with relatively higher temperature product.

In another approach, liquid product is heated to a higher temperature and for a longer time than that which is required to perform adequate pasteurization. Although this approach is sometimes successful at ensuring adequate control of microorganisms, the increased temperature and increased duration for heating may destroy vitamins in a liquid product and/or alter flavor of a liquid product. This increased heating also requires more energy and is therefore less efficient.

In light of the foregoing, there is a need in the art for an improved method and system for pasteurization.

SUMMARY OF THE INVENTION

Accordingly, the present invention is directed to a pasteurization method and system that substantially obviate one or more of the limitations of the related art.

To achieve these and other advantages and in accordance with the purpose of the invention, as embodied and broadly described herein, the invention includes a method of pasteurizing a fluid product, comprising passing the fluid product through a heat exchanger to increase temperature of the fluid product, flowing the heated fluid product through a passageway to a valve, the valve selectively placing the passageway in flow communication with either a diverting flow path or a primary flow path, sensing the temperature of the heated fluid product at a predetermined location in the passageway, the predetermined location being spaced from the valve so that a change in temperature of a portion of the heated fluid product is sensed before that portion of the heated fluid product flows to the valve, controlling the valve so that the valve directs flow of the heated fluid product from the passageway to the diverting flow path when the sensed temperature is below a predetermined temperature for pasteurization of the fluid product, and continues to direct the flow to the diverting flow path at least until the sensed temperature is at or above the predetermined temperature for a predetermined period of time, and operating the valve to direct flow of the heated fluid product from the passageway to the primary flow path.

In another aspect of the invention, temperature of the fluid product is sensed adjacent to the valve to determine whether the temperature of the fluid product is at or above the predetermined temperature before switching the valve from divert flow to primary flow.

In another aspect, the invention includes a system for pasteurizing a fluid product. The system comprises a heat exchanger for heating the fluid product, a passageway fluidly coupled to the heat exchanger so that the heated fluid product flows from the heat exchanger and through the passageway, a valve fluidly coupled to the passageway, a primary flow path, and a diverting flow path, the valve selectively placing the passageway in flow communication with either the diverting flow path or the primary flow path, a first temperature sensor for sensing the temperature of the heated fluid product in the passageway, the first temperature sensor being spaced from the valve so that the first temperature sensor senses a change in temperature of a portion of the heated fluid product before that portion of the heated fluid product flows to the valve, and a controller for controlling the valve to direct flow of the heated fluid product selectively to the primary flow path or to the diverting flow path, the controller controlling the valve so that the valve directs flow of the heated fluid product from the passageway to the diverting flow path when the sensed temperature is below a predetermined temperature for pasteurization of the fluid product, and continues to direct the flow to the diverting flow path at least until the sensed temperature is at or above the predetermined temperature for a predetermined period of time.

In a further aspect, a second temperature sensor is provided for sensing whether temperature of fluid product adjacent to the valve is at or above the predetermined temperature before switching the valve from divert flow to primary flow.

It is to be understood that both the foregoing general description and the following detailed description are exemplary, and are intended to provide further explanation of the invention as claimed.

BRIEF DESCRIPTION OF THE DRAWING

The accompanying drawing is included to provide a further understanding of the invention and is incorporated in and constitutes a part of this specification. The drawing illustrates an embodiment of the invention and, together with the description, serves to explain the principles of the invention.

The drawing includes a schematic view of a fluid product pasteurization system in accordance with an embodiment of the invention wherein broken lines represent electrical interconnections and unbroken lines represent fluid couplings.

DESCRIPTION OF THE PREFERRED EMBODIMENT

Reference will now be made in detail to the present preferred embodiment of the invention, an example of which is illustrated in the accompanying drawing.

In accordance with the invention, there is provided a fluid product pasteurization system. As shown in the drawing, the system includes a liquid product source 10, a heat exchanger 20, a passageway 30 fluidly coupled to the heat exchanger 20, and a directional flow valve 40. As explained below, the directional flow valve 40 directs flow of liquid product heated in the heat exchanger 20 either along a primary flow path 42 or along a diverting flow path 44 depending on the temperature of the heated liquid product.

The system of the present invention can be practiced to pasteurize many different types of fluid products such as pure liquid products or liquid products carrying particles. For example, the system is capable of pasteurizing beverages containing fruit juice, fruit flavor, vegetable juice, or tea. The system is also capable of pasteurizing dairy products, such as milk, ice cream, or cheese. In a preferred embodiment of the invention, the present system is capable of pasteurizing a beverage containing grape juice.

The primary flow path 42 is preferably in fluid communication with a container filling device 50, such as an apparatus capable of filling bottles or cans with the liquid product. The container filling device 50 may optionally include a bowl shaped reservoir for temporarily storing the liquid product. Alternatively, the liquid product flowing through the primary flow path 42 could be processed further and/or stored in a large container or tank (not shown). In some instances, such as when the liquid product is a dairy product, it may be desirable to cool the liquid product as it flows through the primary flow path 42. An optional cooler 48 may also be provided in the primary flow path 42 to cool the liquid product as it flows from the directional flow valve 40.

As shown in the drawing, the divert flow path 44 is preferably in fluid communication with the liquid product source 10 to return under-pasteurized liquid product back to the source 10. Optionally, a cooler 46 is positioned in the divert flow path 44 between the diverting valve 40 and the source 10 to cool the liquid product before it returns to the source 10. The cooler 46 is used when the liquid product in the source could be damaged by prolonged heating, such as when the liquid product is a dairy product.

The liquid product source 10 is any type of storage container or tank capable of storing the liquid product. When the system is used to pasteurize liquid products, such as dairy products, requiring refrigeration during storage, the liquid product source 10 preferably includes refrigeration equipment.

A pump 12 pumps the liquid product from the source 10 to the heat exchanger 20. In the heat exchanger 20, steam or hot water flowing to the heat exchanger 20 via a line 22 transfers heat to the liquid product to increase the temperature of the liquid product and thereby kill microorganisms in the liquid product. The heat exchanger 20 is designed so that steam/hot water and liquid product flowing into the heat exchanger 20 do not mix with one another. For example, the heat exchanger 20 may include a heat conductive plate separating respective passages for the liquid product and for the steam/hot water. Alternatively, the heat exchanger 20 may be a shell and tube heat exchanger or any other known heat exchange design.

To maximize heat transfer, the heat exchanger 20 is preferably a counter-flow heat exchanger wherein relatively warmer steam/hot water entering the heat exchanger 20 heats relatively warmer liquid product just before it exits the heat exchanger 20. In addition, the heated liquid product could be used for regeneration by configuring the heat exchanger 20 so that heated liquid product exiting the heat exchanger 20 heats relatively cooler liquid product flowing to the heat exchanger 20. A controller 60 including one or more microprocessors controls operation of a valve 24 in the line 22 to regulate flow of the steam/hot water supplied to the heat exchanger 20 and thereby regulate temperature of the liquid product heated in the heat exchanger 20. As explained in more detail below, the controller 60 also preferably controls a significant number of other components of the system.

The pump 12 pumps the heated liquid product from the heat exchanger 20 and through the passageway 30 to the directional flow valve 40. In response to signals from the controller 60, the directional flow valve 40 is movable between a primary flow position, in which the directional flow valve 40 permits flow from the passageway 30 to the primary flow path 42 while preventing flow along the divert flow path 44, and a divert flow position in which the diverting valve permits flow from the passageway 30 to the divert flow path 44 while preventing flow along the primary flow path 42. Many different types of valve designs could be used for the directional flow valve 40. In an embodiment of the invention, the directional flow valve 40 is a pneumatic plunger valve.

The passageway 30 is preferably insulated so that the liquid product does not lose a significant amount of heat as it flows from the heat exchanger 20 to the directional flow valve 40. If the liquid product is heated sufficiently in the heat exchanger 20, the heated liquid product remains at or above the predetermined pasteurization temperature for the liquid product while it flows in the passageway 30 to the directional flow valve 40. Preferably, the length and flow capacity of the passageway 30 are sufficient enough to allow the flowing liquid product to reside in the passageway 30 for at least the minimum amount of time required for pasteurization of the liquid product at this predetermined temperature.

Although the passageway 30 shown in the drawing is straight, the passageway 30 may be a curved or coiled to reduce the space required for installation while providing a sufficiently long flow passage. Optionally, the passageway 30 may include an adjustable length portion for changing the length of the passageway 30 during pasteurization of different types of liquid products.

A first temperature sensor 70 and a second temperature sensor 72 are positioned at opposite end portions of the passageway 30. The first temperature sensor 70 is immediately adjacent or adjacent to the heat exchanger 20 to sense temperature of heated liquid product entering the passageway 30. The second temperature sensor 72 is immediately adjacent or adjacent to the directional flow valve 40 to sense temperature of the liquid product flowing from the passageway 30 to the directional flow valve 40. The first and second temperature sensors 70 and 72 send signals to the controller 60 corresponding to the sensed temperatures of the liquid product. The controller 60 controls switching of the directional flow valve 40 between the primary flow position and the divert flow position based on the temperatures sensed by the first and second temperature sensors 70 and 72 to ensure that unpasteurized or under-pasteurized liquid product flows through the divert path 44 rather than through the primary flow path 42.

The first and second temperature sensors 70 and 72 may be any type of temperature sensor capable of being used for liquid pasteurization systems. For example, the temperature sensors 70 and 72 are preferably resistance thermocouple devices or even liquid capillary temperature sensing devices. Each of the sensors 70 and 72 preferably includes multiple sensing elements in a single probe to allow for detection of faulty operation of one or more of the sensing elements in the probe.

The inventor has discovered that temperature sensors used in pasteurization systems, such as the temperature sensors 70 and 72, have a time lag from when the sensors actually encounter a temperature change to when the sensors sense this temperature change. For example, testing has shown that the time lag can be as long as 30 seconds to detect a 2° Fahrenheit temperature change. This time lag can be attributed at least in part to the time required for heat transfer to take place between the liquid product and the temperature sensors. In other words, relatively cooler liquid product cools temperature sensors, such as temperature sensors 70 and 72, over a period of time before the temperature sensors actually sense the decreased temperature.

In the present invention, the sensor time lag is taken into account during design of the system and control of the directional flow valve 40 to ensure that potentially under-pasteurized or unpasteurized product flows through the divert flow path 44 rather than through the primary flow path 42. The first temperature sensor 70 is preferably located a sufficient distance away from the directional flow valve 40 so that the first temperature sensor 70 senses temperature of a portion of the liquid product before that portion of the liquid product flows to the directional flow valve 40 assuming a maximum flow rate for the pump 12.

In other words, the time required for liquid product to flow from the sensor 70 to the directional flow valve 40 at the maximum flow rate of the pump 12 is greater than the time lag of the first temperature sensor 70. To achieve this relationship, the flow capacity of the passageway 30 between the first temperature sensor 70 and the directional flow valve 40 is sufficient to accommodate all of the liquid product pumped from the heat exchanger 20 during maximum flow rate of the pump 12. For example, when the temperature sensor 70 has a 15 second time lag and the pump 12 has a maximum pasteurization flow rate of 100 gallons per minute, the portion of the passageway 30 between the first temperature sensor 70 and directional flow valve 40 preferably has a flow capacity of at least 25 gallons.

The controller 60 monitors output from the first temperature sensor 70 to determine when to switch the directional flow valve 40 from the primary flow position to the divert flow position. When the first temperature sensor 70 senses a temperature less than the required pasteurization temperature for the liquid product, the controller 60 acts in response to the signal from the first temperature sensor 70 to switch the directional flow valve 40 to the divert flow position. The spacing of the first temperature sensor 70 from the directional flow valve 40 ensures that the directional flow valve 40 diverts essentially all of the relatively low temperature liquid product to the diverting flow path 44 before this liquid product has an opportunity to enter the primary flow path 42.

The controller 60 also controls switching of the directional flow valve 40 from the divert flow position to the primary flow position. After the directional flow valve 40 switches to the divert flow position, the controller 60 monitors output from the first temperature sensor 70. When the first temperature sensor 70 initially senses the liquid product is at or above the minimum pasteurization temperature, the controller 60 continues to monitor output from the first temperature sensor 70 for a period of time sufficient to allow substantially all of the liquid product between the first temperature sensor 70 and directional flow valve 40 to flow into the diverting path 44. If the first temperature sensor 70 does not sense a temperature below the minimum required pasteurization temperature during this time period, the controller 60 then determines whether the temperature sensed by the second temperature sensor 72 is at or above the minimum pasteurization temperature. When the temperatures sensed by the temperature sensors 70 and 72 are both at or above the required pasteurization temperature at the end of the time period, the controller 60 switches the directional flow valve 40 from the divert flow position to the primary flow position.

The pasteurization system has a delay from when the first temperature sensor 70 senses a sufficient temperature to when the controller 60 verifies a sufficient temperature sensed by the second temperature sensor 72 and switches the directional flow valve 40 to the primary flow position. The magnitude of the delay is sufficient to purge liquid product between the first temperature sensor 70 and directional flow valve 40 through the divert flow path 44 after the first temperature sensor 70 senses a sufficient temperature. Switching the directional flow valve 40 to the primary flow position after the delay ensures that any relatively lower temperature liquid product positioned between the first and second temperature sensors 70 and 72 flows along the diverting flow path 44. This is particularly useful when cyclical flow of relatively warmer and relatively cooler liquid product fills the passageway 30 and causes both of the temperature sensors 70 and 72 to sense a sufficient temperature while the cooler liquid product is positioned between the temperature sensors 70 and 72.

Although the preferred embodiment of the invention includes both temperature sensors 70 and 72 to monitor whether the liquid product is sufficiently pasteurized, the present invention could also be practiced without the second temperature sensor 72. In such an arrangement, the controller 60 switches the directional flow valve 40 from the divert flow position to the primary flow position after the delay without sensing temperature of the liquid product immediately adjacent to the directional flow valve 40.

A method of pasteurizing a fluid product with the structure shown in the drawing is discussed below. Although the invention is described in association with this structure, the method of the invention in its broadest sense could be practiced with other structures.

At the beginning of a pasteurization procedure, the controller 60 opens the valve 24 to initiate steam flow through the heat exchanger 20 via the steam line 22, while the pump 12 pumps liquid product from the source 10 and through the heat exchanger 20. The steam flowing through the heat exchanger 20 heats the liquid product to eliminate microorganisms present in the liquid product.

The liquid product flows from the heat exchanger 20 to the passageway 30, and the temperature sensor 70 senses temperature of the liquid product as it enters the passageway 30. As the heated liquid product flows through the passageway 30, the liquid product is not cooled significantly. Maintaining the increased temperature of the liquid product in the passageway 30 eliminates additional microorganisms as the liquid product flows to the directional flow valve 40.

At the beginning of the pasteurization process, the directional flow valve 40 is in the divert flow position so that the liquid product flows initially through the divert flow path 44. Optionally, the cooler 46 cools the liquid product, and the diverted liquid product returns to the source 10.

The controller 60 monitors the temperature sensed by the first temperature sensor 70. When this sensed temperature is at or above the minimum temperature required for adequate pasteurization of the liquid product, the controller 60 continues to monitor the temperature sensed by the first temperature sensor 70 for a period of time long enough to allow all of the liquid product between the first temperature sensor 70 and directional flow valve 40 to flow along the diverting flow path 44. When the second temperature sensor 72 is not present, the controller 60 switches the directional flow valve 40 to the primary flow position if the temperature sensed by the first temperature sensor 70 is at or above the minimum pasteurization temperature during this time period.

The system operates similarly when the second temperature sensor 72 is included. If the temperature sensed by the first temperature sensor 70 is at or above the minimum pasteurization temperature during the time period, the controller 60 determines the temperature sensed by the second temperature sensor 72 at the end of the time period. If the temperatures sensed by the first and second temperature sensors 70 and 72 are at or above the required minimum pasteurization temperature, the controller 60 switches the directional flow valve 40 to the primary flow position.

In the primary flow position of the directional flow valve 40, the liquid product flows along the primary flow path 42 for further processing or storage. During processing of certain liquid products, such as milk, the cooler 48 cools the liquid products. In a preferred practice of the invention, the container filling device 50 fills containers with the liquid product flowing in the primary flow passage 42.

The controller 60 preferably monitors the first and second temperature sensors 70 and 72 throughout the pasteurization process. If one or both of the temperature sensors 70 and 72 senses a temperature below the minimum pasteurization temperature at any time during the pasteurization process, the controller 60 controls the directional flow valve 40 to continue flow to the divert path 44 or to switch flow to the divert path 44. This limits the amount of under-pasteurized liquid product flowing to the primary flow path 42.

It will be apparent to those skilled in the art that various modifications and variations can be made to the structure and methodology of the present invention without departing from the scope or spirit of the invention. The system and method of the present invention can be practiced to pasteurize many different types of fluid products such as pure liquid products or liquid products carrying particles. In view of the foregoing, it is intended that the present invention cover modifications and variations of this invention provided they fall within the scope of the following claims and their equivalents.

What is claimed is:

1. A method of pasteurizing a fluid product, comprising:
    passing the fluid product through a heat exchanger to increase temperature of the fluid product;
    flowing the heated fluid product through a passageway to a valve, the valve selectively placing the passageway in flow communication with either a diverting flow path or a primary flow path;
    sensing the temperature of the heated fluid product at a predetermined location in the passageway, the predetermined location being spaced from the valve so that a change in temperature of a portion of the heated fluid product is sensed before that portion of the heated fluid product flows to the valve;
    controlling the valve so that the valve directs flow of the heated fluid product from the passageway to the diverting flow path when the sensed temperature is below a predetermined temperature for pasteurization of the fluid product, and continues to direct the flow to the diverting flow path at least until the sensed temperature is at or above the predetermined temperature for a predetermined period of time; and
    operating the valve to direct flow of the heated fluid product from the passageway to the primary flow path.

2. The method of claim 1, wherein the predetermined period of time is at least the amount of time required for the portion of the heated fluid product to flow from the predetermined location in the passageway to the valve.

3. The method of claim 2, further comprising sensing the temperature of the heated fluid product at a second location in the passageway adjacent to the valve, and controlling the valve so that the valve directs the heated fluid product to the diverting flow path if the temperature sensed at the second location is below the predetermined temperature at the end of the predetermined period of time.

4. The method of claim 3, wherein the sensing of the temperature of the heated fluid product at the predetermined location includes sensing temperature of the fluid product with a first temperature sensor having a time lag for sensing change in temperature of the fluid product, and wherein the sensing of the temperature of the heated fluid product at the second location includes sensing temperature of the fluid product with a second temperature sensor having a time lag for sensing change in temperature of the fluid product.

5. The method of claim 1, further comprising sensing of the temperature of the heated fluid product at a second location in the passageway adjacent to the valve, and controlling the valve so that the valve directs the heated fluid product to the diverting flow path if the temperature sensed at the second location is below the predetermined temperature at the end of the predetermined period of time.

6. The method of claim 1, wherein the sensing includes sensing the temperature of the fluid product with a temperature sensor having a time lag for sensing change in temperature of the fluid product.

7. The method of claim 1, wherein the fluid product is a beverage containing fruit juice or fruit flavor, and the method further comprises filling containers with the beverage when the beverage flows along the primary flow path.

8. The method of claim 1, wherein the method further comprises cooling the fluid product and filling containers with the cooled fluid product when the fluid flows along the primary flow path.

9. The method of claim 8, wherein the fluid product is milk.

10. A system for pasteurization of a fluid product, comprising;
    a heat exchanger for heating the fluid product;
    a passageway fluidly coupled to the heat exchanger so that the heated fluid product flows from the heat exchanger and through the passageway;
    a primary flow path;
    a diverting flow path;
    a valve fluidly coupled to the passageway, the primary flow path, and the diverting flow path, the valve selectively placing the passageway in flow communication with either the diverting flow path or the primary flow path;

a first temperature sensor for sensing the temperature of the heated fluid product in the passageway, the first temperature sensor being spaced from the valve so that the first temperature sensor senses a change in temperature of a portion of the heated fluid product before that portion of the heated fluid product flows to the valve; and a controller for controlling the valve to direct flow of the heated fluid product selectively to the primary flow path or to the diverting flow path, the controller controlling the valve so that the valve directs flow of the heated fluid product from the passageway to the diverting flow path when the sensed temperature is below a predetermined temperature for pasteurization of the fluid product, and continues to direct the flow to the diverting flow path at least until the sensed temperature is at or above the predetermined temperature for a predetermined period of time.

11. The system of claim 10, wherein the controller is configured to control the valve so that the valve continues to direct the flow to the diverting flow path at least until the sensed temperature is at or above the predetermined temperature for at least the amount of time required for the portion of the heated fluid product to flow in the passageway from the first temperature sensor to the valve.

12. The system of claim 11, further comprising a second temperature sensor for sensing the temperature of fluid product in the passageway adjacent to the valve, the controller controlling the valve so that the valve directs the flow of the heated fluid product to the diverting flow path if the second temperature sensor senses a temperature below the predetermined temperature at the end of the predetermined period of time.

13. The system of claim 12, wherein the first and second temperature sensors are temperature sensors configured to have a time lag for sensing change in temperature of the fluid product, and wherein the controller is configured to control the valve so that the valve maintains the flow to the diverted flow path during the time lag.

14. The system of claim 10, further comprising a second temperature sensor for sensing the temperature of fluid product in the passageway adjacent to the valve, the controller controlling the valve so that the valve directs the flow of the fluid product to the diverting flow path if the second temperature sensor senses a temperature below the predetermined temperature at the end of the predetermined period of time.

15. The system of claim 10, wherein the first temperature sensor is a temperature sensor configured to have a time lag for sensing change in temperature of the fluid product, and wherein the controller is configured to control the valve so that the valve maintains the flow to the diverted flow path during the time lag.

16. The system of claim 10, further comprising a container filler fluidly coupled to the primary flow path, the container filler being capable of filling containers with fluid product flowing along the primary flow path.

17. The system of claim 16, further comprising an additional heat exchanger fluidly coupled to the primary flow path so that the additional heat exchanger cools the fluid product before the fluid product flows to the container filler.

* * * * *